United States Patent [19]

Vallee et al.

[11] 4,451,539

[45] May 29, 1984

[54] SURFACING FOILS FOR COATING PLASTICS PARTS

[75] Inventors: Antoine Vallee; Michel Goguelin, both of Charavines, France

[73] Assignee: Arjomari-Prioux, France

[21] Appl. No.: 392,678

[22] Filed: Jun. 28, 1982

[30] Foreign Application Priority Data

Jul. 2, 1981 [FR] France .................. 81 13029

[51] Int. Cl.$^3$ .............................. B32B 27/08
[52] U.S. Cl. .................. 428/515; 428/516; 428/520; 524/521; 524/523; 524/583; 524/584; 524/423
[58] Field of Search ............ 524/521, 522, 583, 584, 524/423; 428/515, 516, 520

[56] References Cited

U.S. PATENT DOCUMENTS 4,104,226 8/1978 Melzer et al. .................. 524/521

FOREIGN PATENT DOCUMENTS 53-147744 12/1978 Japan .................. 524/522

Primary Examiner—Lewis T. Jacobs
Attorney, Agent, or Firm—Bacon & Thomas

[57] ABSTRACT

The present invention relates to semi-finished products in sheet or surfacing foil form for producing thermoplastic coatings with particular properties on finished parts produced by thermoforming or molding-stamping thermoplastic materials in plate or sheet form. These are constituted by: a basic mixture comprising 15%–95% by weight of reinforcing fiber, 85%–5% by weight of powder of at least one thermoplastic material, and, relative to this mixture, 2%–20% by weight of polyolefine dough, 1%–30% by weight of a binder, 0.2%–10% by weight of at least one floculant and if necessary a dispersing agent. These surfacing foils are characterized in that they contain: from 30 to 90% by weight of at least one polyolefine dough, from 2 to 15% by weight of binder, from 0.5 to 5% by weight of at least one floculant, the rest of the materials being composed of at least one powder element selected from among thermoplastics, fillers and pigments.

4 Claims, No Drawings

SURFACING FOILS FOR COATING PLASTICS PARTS

BACKGROUND OF THE INVENTION

The present invention relates to a novel class of thermoplastic material called "surfacing foils" and to the process for their preparation. These foils are intended to confer particular surface properties on plastics parts, more particularly those derived from thermoforming or from molding-stamping of thermoplastic materials in sheets or in plates, flexible or rigid, and which may or may not include reinforcing fibers.

DESCRIPTION OF THE PRIOR ART

It is known that there are difficulties which often have to be reconciled in a plastics article with regard to mechanical properties or the like conferred by the mass of the article, and a surface state having one or several particular physical, chemical or visual properties. This problem is encountered particularly with thermoplastics (high density polyethylene, polypropylene, polyamide) reinforced with glass fibers, obtained by thermoforming or molding-stamping materials into currently known sheets or plates, which are flexible or rigid and which are prepared by various processes including the paper making method. Thus Applicant has described in French patent application No. 80/09858, a material formed by a basic mixture comprising 15 to 95% by weight of reinforcing fibers, 85 to 5% by weight of a powder of at least one thermoplastic material and, relative to this basic mixture, 2 to 20% by weight of polyolefine dough, 1 to 30% by weight of a binder and 0.2 to 10% by weight of at least one flocculant. These materials lead, by heat transformation to finished products whose surface appearance and suitability for receiving paint are mediocre. Now, in the present state of the art, it is only possible to overcome this state:

by proceeding with coating by a layer or a fabric previously deposited prior to heat treatment in one or two half-molds, but this solution remains obviously of limited use, or by a process of plastic surfacing, but it is then necessary to resort to an additional molding operation.

It has been found, and this is wherein lies the object of the present invention, that it was advantageously possible to realize the thermocoating of the above described finished products by arranging during the surface heat-treatment at the surface of the materials in sheets or in plates envisaged above, another material as a foil called "surfacing foil" obtained by a paper making process and which enables a thermoplastic coating to be given to the finished object without a supplementary step. In addition, all types of particular surface properties can be conferred on the finished object according as such elements are incorporated in the composition of said surface foils which is possible to vary easily by means of the very easily adaptable process represented by papermaking.

GENERAL DESCRIPTION OF THE INVENTION

According to the invention there are provided surfacing foils which are characterized in that they are flexible and comprise:

from 30 to 90% by weight of at least one polyolefine dough,
from 2 to 15% by weight of binder,
from 0.5 to 5% by weight of at least one flocculant, and the rest of the materials can include at least one powder element selected from among thermoplastics, fillers and pigments . . . , that is to say it contains all the elements capable through their presence at the surface of the finished object:

either of improving the properties such as abrasion resistance, temperature behavior, adhesion of paints, electrical conduction, resistance to chemical agents, behavior on aging, or of producing a certain tactile or visual appearance: smooth, matt, or metallized surface.

In the present invention, the polyolefine dough, on the one hand, performs at the time of preparing the foil, a fibrous network which insures the retention of the powder elements and a certain mechanical behavior, and on the other hand, plays, by fusion during the production of the finished product, the role in whole or in part of thermoplastic matrix and participates in the cohesion of the surface coating with the support arising from the transformation of the materials into currently known sheets or into plates. The amount of polyolefine dough usable is from 30 to 90% by weight with respect to the weight of the foil since, if less than 30% of dough is used, the foil no longer has sufficient mechanical properties to be formed and manipulated. If more than about 60% by weight of dough is used, the foil posesses optimal mechanical properties which are preserved until a content of 90% by weight of said dough is reached. Mixtures of polyolefine may advantageously be employed. The surfacing foils are obtained by means of conventional technology in the papermaking field and therefore include a binder such as those of Table 1 below, which ensure the bonding of the constituents together, as well as at least one flocculant such as those of Table 2 below.

These foils comprise in addition a total of 5 to 70% by weight of one or several powder elements whose maximum average powder size is limited by the possabilities of papermaking to about 500μ and which are selected according to the surface state desired from among:

(1) Thermoplastics:
polyethylenes, polypropylenes, polyamides, polyvinyl chlorides, polystyrenes, ABS, . . .
(2) Thermoplastic elastomers:
EPDM, SBS
fine rubber dust and any other flexibilizing agents, it being understood that all these organic elements mentioned at (1) and (2) must be used in proportions such that, in the application of the foils to the surface of the plastics parts, they form together and with the polyolefine fibrous mass, a stable mixture without notable degradatinn of the essential properties (taking into account the possible presence of fillers and/or ground fiber elements and/or compatibility agents) and having good adhesion to the object thus coated.

(3) Inorganic fillers such as talcs, silicas . . . (If necessary treated with coupling agents) as used in the plastics industry, as well as ground glass fiber (whose average length is 200μ, that is to say their properties are no longer comparable to those of the initial reinforcing fibers)

(4) Carbon (conductive or nonconductive)

(5) Colored pigments, aluminum (pearlescent agents), compatibility agents, anti-oxidants . . . .

The use of a certain percentage of filler, particularly ground fiberglass, enables the shrinkage of the surface coating with respect to the support to be controlled.

For the production of the mixture in water of all the abovementioned ingredients composing the surface foil, there is carried out, successively and to the extent that they are provided in the composition, the mixing of the ground fiber elements of the polyolefine dough, of the polyvinyl alchohol fibers and then of the various inorganic and/or organic powders, then, if necessary a portion of the floculating agent then the binder and finally the remainder of the floculating agent before or after dilution until an aqueous suspension is obtained containing about 0.01 to 5% solid products. The mixture can then be treated on known paper manufacturing machines to give a flexible sheet, of variable mass per unit surface in which the various elements are perfectly retained.

The flexible material so obtained called surfacing foil is applied, after having been more or less heated according to the transformation process of the user, by lining, according to the mass per unit surface and the effect desired, with one to three layers either the positive half mold, or the negative half mold, or both.

After thermoforming or molding-stamping this material with one of the thermoplastic materials into sheets or into plates, reinforced or unreinforced, presently known, there is obtained, without the manufacturing sequence having to be considerably modified, a plastics part having on one or both surfaces a thermoplastic coating of given characteristics which result from the fusion of the one or more surfacing foil layers.

DESCRIPTION OF PARTICULAR EMBODIMENTS

The following nonlimiting examples are given to illustrate the invention.

EXAMPLE 1

40 g of ground unoiled glass fiber was dispersed under vigorous stirring in 0.4 liter of water and then poured into 2.4 liters of a previously dispersed mixture of synthetic polyethylene and polypropylene dough, respectively 20 and 40 g. After correct homogenization with moderate stirring, 20 g of a polypropylene powder of average granulometry $80\mu$ is introduced and then 40 g of a talc of granulometry centered around $16\mu$. Then 20 g dry of a binder which is a polymer of the acrylic type reference L1 in Table 1 below, and then 2 g dry of floculant noted as P1 in Table 2 below were added. After dilution to about 3.5 g of solid matter per liter, the mixture was finally brought on to a gauze with the addition just before the formation of the foil of 0.5 g of floculant P2, then drained, and dried according to the conventional papermaking technique. In this way a flexible foil of weight per unit surface 500 g/m² was obtained, having a tensile strength of 1.2 decanewtons/15 mm and in which the various element are perfectly retained.

Such a surface foil previously heated and deposited in two thicknesses against one of the two half molds gives, after molding-stamping of a material of polypropylene sheet reinforced with 30% of fiberglass, a rigid part, of thickness 3 mm, which, with respect to an uncoated control, preserves excellent physical properties but shows in addition on one of its surfaces, a smooth and homogeneous appearance.

EXAMPLE 2

In 2.4 liters of water, there were dispersed with moderate stirring, 20 g of polyethylene dough and 40 g of polypropylene dough. After suitable mixing, 40 g of a talc of average granulometry $0.75\mu$ were introduced then 10 g dry of binder L1 and finally 1 g dry of floculant P1. The suspension was then treated as in Example 1 to give a sheet of 500 g/m² whose resistance to traction was 1.5 decanewtons/15 mm.

This foil applied as in Example 1, but on the two half molds, enabled the production of a plastics part soft to the touch and of shiny appearance.

EXAMPLE 3

The same process and the same product as those of Example 1 we used, but the talc was replaced by 15 g of a conducting carbon black.

The foil so produced and applied to a surface forms a smooth coating which is particularly suitable for painting.

EXAMPLE 4

The same process as that described in Example 2 was used, but the inorganic filler used was silica treated on the surface by a coupling agent and of average granulometry $1.5\mu$.

EXAMPLE 5

Example 2 was reproduced but adding to the mixture of polyolefine dough 40 g of a polypropylene powder, 10 g of a elastomer powder of the styrene-butadiene type: the binder L1 and the floculant P1 were added in a ratio of respectively 15 g to 1.5 g.

In this way the surfacing foil was produced which enable a flexible coating to be applied to fiberglass reinforced polypropylene articles.

EXAMPLE 6

Example 5 was repeated employing as thermoplastic elastomer a powder of a copoly/ethylene-propylene) of average granulometry of $500\mu$.

EXAMPLE 7

Example 1 was repeated replacing the talc by 0.05 g of carbon black and 3 g of a pigment (mica-titanium dioxide) with silver mother of pearl. After applying with a polypropylene reinforced with 30% fiberglass, a uniform surface of metallic grey appearance was observed.

EXAMPLE 8

The preceding example was repeated but this time using using 10 g of a pigment based on spangled aluminum which conferred on the finished object a lustrous metallic surface.

TABLE 1

| Reference | Binders Which Can Be Used — Type of Binder |
|---|---|
| L1 | Polymer containing 87 to 90 parts by weight of ethyl acrylate units, 1 to 8 parts by weight of acrylonitrile units, 1 to 8 parts of N—methylolacrylamide units and 1 to 6 parts by weight of acrylic acid units. 40–55% aqueous dispersion. |
| L2 | Polymer containing 60 to 75 parts by weight of ethyl acrylate units, 5 to 15 parts by weight of acrylonitrile units, 10 to 20 parts by weight of butyl acrylate units, 1 to 6 parts by weight of N—methylolacrylamide units. 40–55% aqueous dispersion. |
| L3 | Polymer containing 60 to 65 parts by weight of butadiene units, 35 to 40 parts by weight of |

TABLE 1-continued

Binders Which Can Be Used

| Reference | Type of Binder |
|---|---|
| | acrylonitrile units and 1 to 7 parts by weight of methacrylic acid units 40-55% aqueous dispersion. |
| L4 | Polymer containing 38 to 50 parts by weight of styrene units, 47 to 59 parts by weight of butadiene units and 1 to 6 parts by weight of methylacrylamide units. 40-55% aqueous dispersion. |
| L5 | Polymer containing 53 to 65 parts by weight of of styrene units, 32 to 44 parts by weight of butadiene units and 1 to 6 parts by weight of methlacrylamide units. 40-55% aqueous dispersion. |
| L6 | Polymer containing 40 to 50 parts by weight of styrene units, 25 to 30 parts by weight of butadiene units, and 2 to 7 parts by weight of carboxylic acid units and the remainder butylacrylate units. 50% aqueous dispersion. |

TABLE 2

Floculating Agents

| Reference | Type of Floculant |
|---|---|
| P1 | Aluminum sulfate |
| P2 | Aluminum polychloride (aluminum hydroxychloride) |
| P3 | Sodium and calcium aluminate |
| P4 | Polyacrylic acid and polyacrylamide mixture in 5-30% (weight/volume) solution |
| P5 | Polyethylene imine in 2-50% (weight/volume) solution |
| P6 | Copolymer of acrylamide and a quaternary cationic monomer |
| P7 | Polyamine-epichlorhydrin resin and diamine-propylmethylamine, in 2-50% solution |
| P8 | Polyamide-epichlorhydrin resin made from epichlorhydrin, adipic acid, caprolactam, diethylenetriamine and/or ethylenediamine, in 2-50% solution |
| P9 | Polyamide-polyamine-epichlorhydrin resin made from epichlorhydrin, dimethyl ester of adipic acid and diethylenetriamine, in 2-50% solution |
| P10 | Polyamide-epichlorhydrin resin made from epichlorhydrin, diethylenetriamine, adipique acid and ethyleneimine |
| P11 | Polyamide-epichlorhydrin resin made from adipique acid, diethylenetriamine and a mixture of epichlorhydrin and dimethylamine, in 2-50% solution |
| P12 | Cationic polyamide-polyamine resin made from triethylenetriamine |
| P13 | Condensation products of aromatic sulfonic acid with formaldehyde |
| P14 | Aluminum acetate |
| P15 | Aluminum formate |
| P16 | Mixture of aluminum acetate, sulfate and formate |
| P17 | Aluminum chloride (AlCl$_3$) |
| P18 | Cationic starch |

Note: Where solutions are concerned, they are aqueous solutions.

We claim:

1. A surfacing foil composition for coating a plastic article which foil comprises from 30% to 90% by weight of at least one polyolefin dough; from 2% to 15% by weight of a binder; 0.5% to 5% by weight by at least one flocculant and the remainder comprising at least one powder element selected from the group consisting of thermoplastics, thermoplastic elastomers, fillers, carbon and pigments.

2. The surfacing foil composition of claim 1 wherein the polyolefin dough comprises a mixture of polyethylene and polypropylene; the binder is a 40-55% aqueous dispersion of a polymer containing 87 to 90 parts by weight of ethyl acrylate units, 1 to 8 parts by weight of acrylonitrile units, 1 to 8 parts of N-methylolacrylamide units and 1 to 6 parts by weight of acrylate acid units; the flocculant is aluminum sulphate; and the powder element contains glass fiber, polypropylene powder, and talc.

3. An improved plastic article which comprises 15% to 95% by weight of reinforcing fibers; 5% to 85% by weight of a powder of at least one thermoplastic material and, with respect to this mixture, 2% to 20% by weight of a polyolefine dough; 1% to 30% by weight of a binder and 0.2 to 10% by weight of at least one flocculant, wherein the improvement comprises:

a coating on the article, said coating being an attached surfacing foil which comprises; from 30% to 90% by weight of at least one polyolefin dough; from 2% to 15% by weight of a binder; 0.5% to 5% by weight of at least one flocculant and remainder comprising at least one powder element selected from the group consisting of thermoplastics, thermoplastic elastomers, fillers, carbon and pigments.

4. The plastic article of claim 3 wherein the attached surfacing foil comprises a polyolefin dough comprising a mixture of polyethylene and polypropylene; a binder which is a 40-55% aqueous dispersion of a polymer containing 87 to 90 parts by weight of ethyl acrylate units, 1 to 8 parts by weight of acrylonitrile units, 1 to 8 parts of N-methylolacrylamide units and 1 to 6 parts by weight of acrylate acid units; the flocculant is aluminum sulphate; and the powder element contains glass fiber, polypropylene powder, and talc.

* * * * *